Jan. 16, 1945.   M. J. KITTLER   2,367,507
VARIABLE VENTURI TYPE CARBURETOR
Filed Nov. 16, 1942
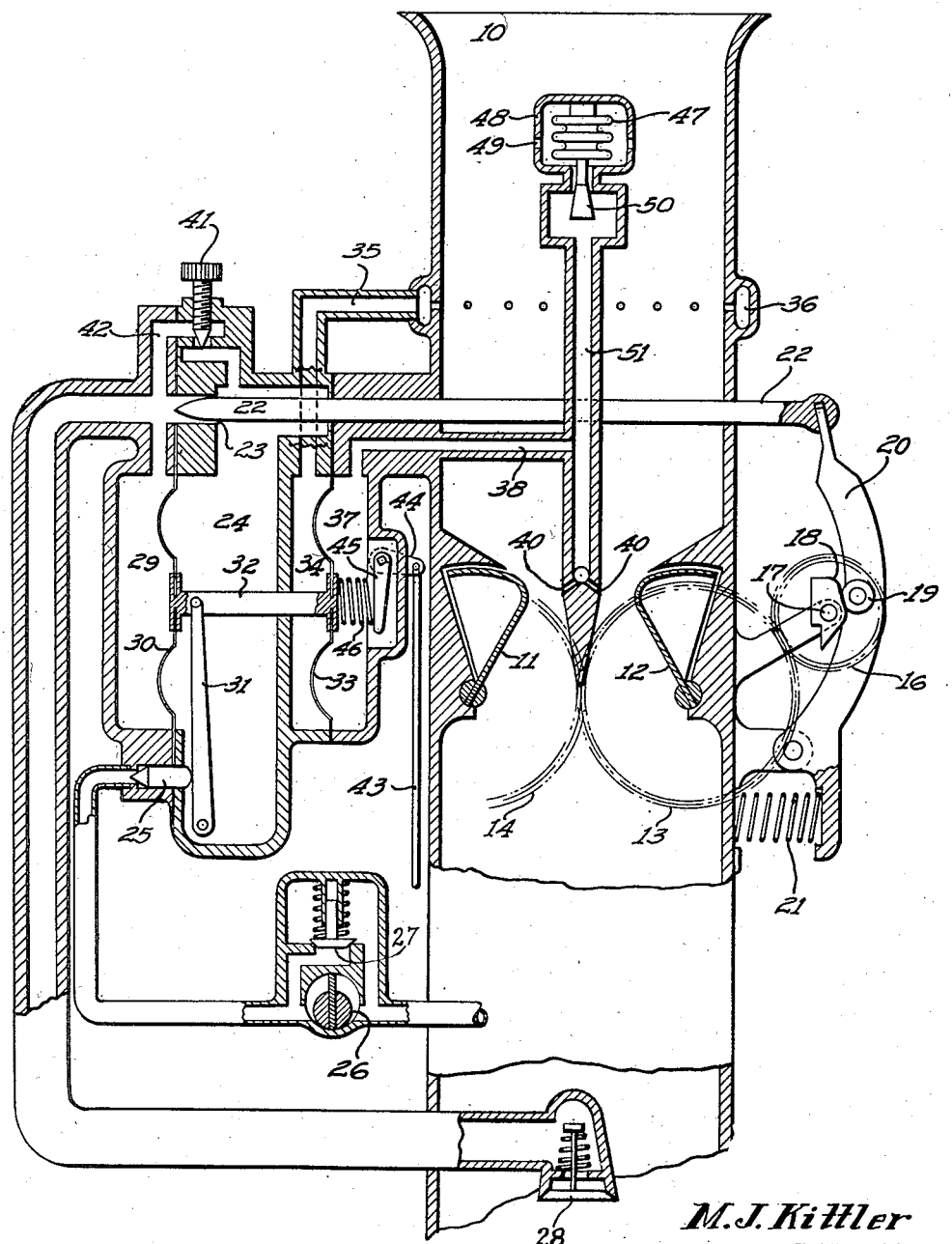
M. J. Kittler
INVENTOR.

Patented Jan. 16, 1945

2,367,507

UNITED STATES PATENT OFFICE 2,367,507

VARIABLE VENTURI TYPE CARBURETOR

Milton J. Kittler, Detroit, Mich., assignor to George M. Holley and Earl Holley

Application November 16, 1942, Serial No. 465,773

2 Claims. (Cl. 261—50)

The object of this is to improve the operation of that form of airplane engine carburetor known as the pressure type. In this type of carburetor, fuel under pressure is discharged on the engine side of the throttle and the flow is regulated by the depression in the venturi located on the atmospheric side of the throttle. Obviously at low air flows, the depression of the venturi is very weak. Hence, the regulation of the fuel is most uncertain. In order to overcome this, I have combined the throttle with the venturi and utilized the variable venturi so formed for the creation of the necessary suction for metering the fuel. Obviously, at closed throttle, the suction is then at a maximum. Hence, the fuel metering orifice must be reduced with the variable venturi.

The figure shows diagrammatically the elements of my invention. 10 is the air entrance, 11 and 12 are the two elements of the variable venturi. 13 and 14 are two gears interconnecting the two elements 11 and 12. The gear 13 engages with a gear 16 mounted on the shaft 17 on which is mounted a cam 18. The roller 19 mounted on the lever 20 engages with the surface of the cam 18. A spring 21 holds the roller 19 in engagement with the cam surface 18. A needle 22 known as the metering pin is moved by the lever 20 and controls an orifice 23 which is the main fuel metering orifice. Obviously, as cam 18 rotates anticlockwise, the element 12 rotates clockwise and the element 11 anticlockwise. Thus the needle 22 opens the orifice 23 in proportion as the elements 11 and 12 open the variable venturi which is formed between them. The rate of flow through the orifice 23 is controlled by the pressure difference to the right and left of this orifice. The pressure in the chamber 24 is determined by the opening of the fuel inlet valve 25 to which fuel is supplied by the pump 26. The pressure difference of the pump 26 is maintained substantially constant by means of a pressure release valve 27. The valve 25 is regulated by the action of the lever 31 which is connected with the diaphragm 30 and 33 through the rod 32. The fuel passes the orifice 23 and flows to a spring loaded discharge nozzle 28 located in the air inlet passage downstream from the variable Venturi throttles 11 and 12. The pressure on the downstream side of the orifice 23 is communicated through an open passage to chamber 29 and through to the diaphragm 30. The diaphragm 30 is located between the chambers 24 and 29. The rod 32 connects the diaphragm 30 with a corresponding diaphragm 33. These two diaphragms therefore are thus rigidly connected with each other. Diaphragm 33 separates an air chamber into two halves 34 and 37. The chamber 34 is in communication with the air entrance 10 through a passage 35 and vent ring 36. Substantially atmospheric pressure exists therefore in the chamber 34. Chamber 37 at the right of diaphragm 33 communicates through the passage 38, passage 39 opening 40 with the throat of the variable venturi 11—12. The diaphragm 30 on the other end is responsive to the pressure difference of the fuel flowing through the orifice 23. The fuel and air flows are maintained proportional because the difference of pressure created by the flow of fuel past the needle valve 22 balances the difference of pressure created by the flow of air through the venturi 12. Both differences of pressure normally vary as the square of the velocity of flow. Hence, we have in its simplest possible form, a method of balancing air flow with fuel flow. It is necessary, however, to provide means to:

(A) Adjust for idle.
(B) Vary the mixture ratio.
(C) Control for altitude.
(D) Shut off the fuel.

A. A bypass 42 leads from the chamber 24 to the discharge nozzle 28 and the needle valve 41 regulates the flow.

B. The mixture control link 43 controls a lever 44 which connects with a similar lever 45 located inside chamber 37. The lever 45 engages with a compression spring 46 which imposes an artificial load on the rod 32 in addition to the normal load created by the air flow. The effect of an increase of load on the spring 46 is to diminish the fuel flow admitted past the valve 25 and discharged out of the nozzle 28.

C. To control the mixture ratio at altitude evacuated elements 47 located in a chamber 48 (which is maintained at an atmospheric pressure through openings 49) control a valve 50 which at high altitude admits more air to the passage 51, which passage 51 is an extension of the passage 39. In other words, atmospheric pressure is admitted to the chamber 37. The opening past the valve 50 is not large enough to destroy the suction at the openings 40. Hence the valve 50 can never admit atmospheric pressure in the chamber 37, and there will always be a depression in the chamber 37 which depression will vary with the air flow past the orifice 40.

D. Obviously, if the link 43 is moved all the way down, the valve 25 can not open and there will be a complete stoppage of the fuel.

Operation

When operating at sea level with the throttle closed, the barometric element 47 causes the valve 50 to restrict the admission of atmospheric air to the passage 51. The result is that the depression in the chamber 37 is substantially that existing in the throat of the variable venturi and the pressure in the chamber 34 is substantially atmospheric pressure. Hence, the diaphragm 33 is pushed to the right by the difference in pressure between the pressure in the throat of the venturi and the atmospheric pressure. This causes the rod 32 to move to the right which permits the fuel valve 25 to open and thus admit fuel under pressure to the chamber 24 which flows out past the needle valve 22 creating an increased pressure drop across the fuel orifice 23. This increased pressure drop causes a lower pressure in the chamber 29 relative to the pressure in the chamber 24. This increased pressure drop causes the rod 32 to move to the left, hence the two diaphragms 30 and 33 are maintained in equilibrium. As the throttles 11, 12 are opened the orifice 22 also opens and the same proportional flow is maintained. At altitude the barometric element 47 expands and atmospheric air is admitted to passage 51 and therefore the flow of fuel is reduced by the atmospheric air entering the passage 51. Hence the tendency for the fuel to become richer is corrected.

What I claim is:

1. In a carburetor of the pressure type, an air entrance air throttling means therein of the variable Venturi type, a fuel supply system adapted to supply fuel under pressure, a fuel entrance chamber, a valve admitting fuel under pressure to said chamber, a fuel outlet, a movable restriction therein connected to said air throttling means so that the fuel outlet increases with the opening of the variable venturi, a second fuel chamber communicating with the fuel on the downstream side of said fuel restriction, said first and second chambers having a diaphragm which forms a common wall therebetween, a corresponding pair of air chambers having a diaphragm which form a common wall therebetween, a passage connecting the 1st of said air chambers with the air entrance, a passage connecting the 2nd of said air chambers with the throat of said variable venturi, linkage connecting said fuel diaphragm and said air diaphragm together and with said fuel entrance valve whereby an increase in the air flow tends to open the fuel entrance valve and an increase in fuel flow tends to close the fuel entrance valve.

2. A device as set forth in claim 1 in which there is a barometric responsive air valve located in the air entrance, said valve adapted to admit air under atmospheric pressure to the passage leading to the 2nd of said air chambers so as to reduce the pressure difference between said air chamber at high altitudes and thus reduce the fuel flow.

MILTON J. KITTLER.